April 26, 1949. M. S. MEAD, JR 2,468,569
FREQUENCY REGULATING SYSTEM
Filed Sept. 12, 1947 2 Sheets-Sheet 2
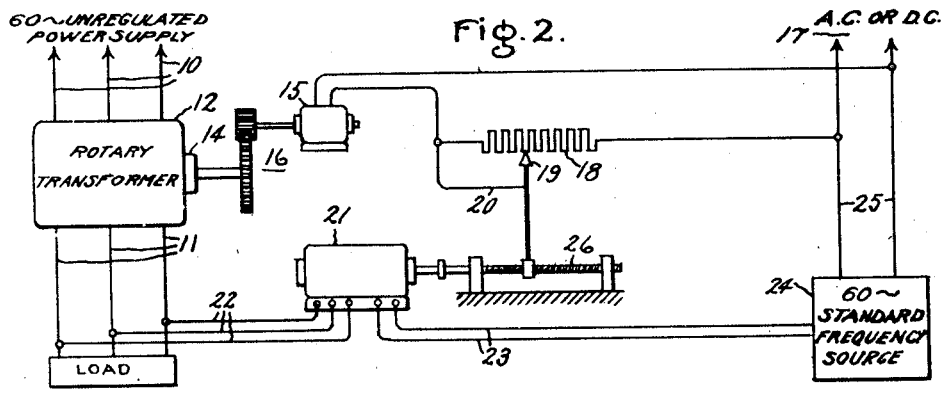
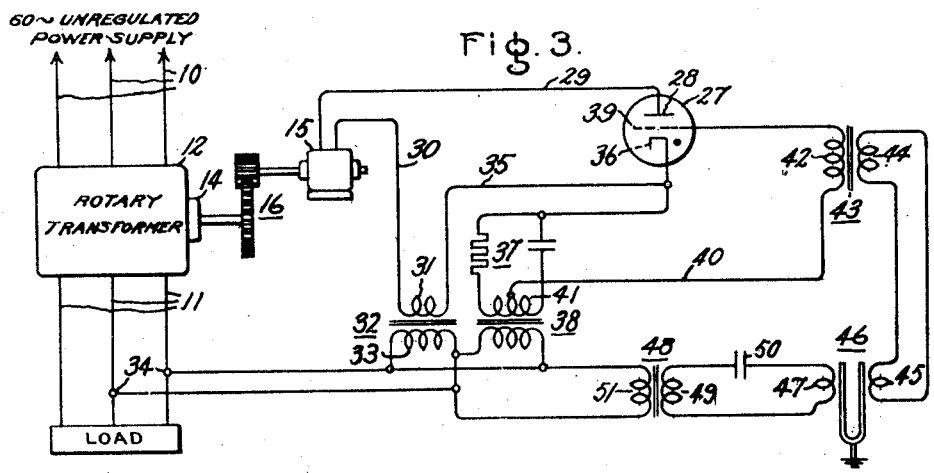
Inventor:
Milton S. Mead, Jr.
by Prowell P. Mack
His Attorney.

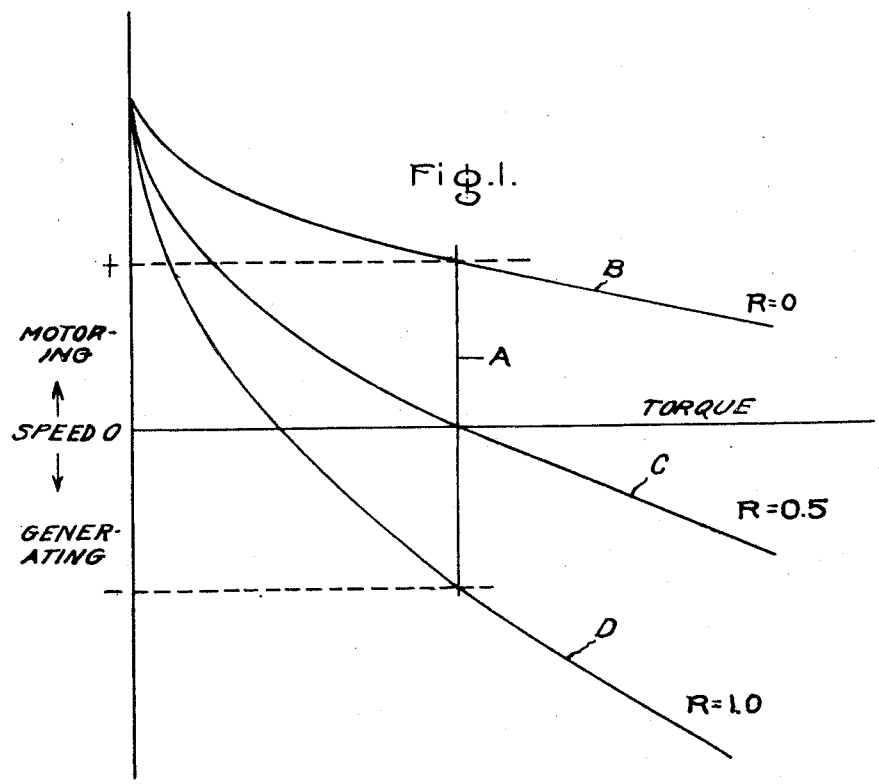

Patented Apr. 26, 1949

2,468,569

UNITED STATES PATENT OFFICE 2,468,569

FREQUENCY REGULATING SYSTEM

Milton S. Mead, Jr., Schenectady, N. Y., assignor to General Electric Company, a corporation of New York Application September 12, 1947, Serial No. 773,532

5 Claims. (Cl. 321—61)

This invention relates to frequency-regulating systems and more particularly to improvements in the type of frequency-regulating system described in United States Letters Patent No. 2,074,126, granted March 16, 1937, upon an application of Milton S. Mead, Jr., and assigned to the same assignee as the present application.

According to the aforesaid patent, alternating current is supplied from a primary system, through a rotary transformer, to a secondary alternating current system at a lower frequency. The speed of the rotary transformer is controlled by an electrical brake, such as an hysteresis generator, in response to a standard frequency source so as to maintain the secondary frequency at a constant value regardless of variations in the frequency of the primary system.

The present invention is directed to improvements in the control of the rotor speed of such a rotary transformer. In place of the hysteresis generator of my prior patent, the present invention utilizes a series motor geared to the rotor of a rotary transformer so that the required maximum speed of the rotor either positive or negative corresponds to the full speed rating of said series motor. A system is thus provided in which the series motor provides a torque which opposes and balances the torque of the transformer rotor; and in which at times the motor may drive the transformer rotor, while at other times the transformer rotor may drive the motor, as required to maintain the desired output frequency.

An object of this invention is to provide improved apparatus for supplying regulated frequency electric power from an unregulated source.

Another object is to provide simplified and more efficient means for supplying regulated frequency electric power from a source having an unregulated frequency which at times may be greater than, equal to, or less than the desired regulated frequency.

Other objects and advantages will appear as the description proceeds.

The features of the present invention which are believed to be novel and patentable will be pointed out in the claims appended hereto. For a better understanding of the invention, reference is made in the following description to the accompanying drawings in which Fig. 1 is a graph of the speed versus torque curve of a rotary transformer with constant load and secondary frequency together with a family of speed versus torque curves of a series motor, and Figs. 2, 3 and 4 are diagrammatic representations of several systems embodying the present invention.

Reference may now be made to Fig. 1 which is a graph of the speed versus torque curve A of a rotary transformer of a type to be described hereinafter and a family of speed versus torque curves B, C and D of a series motor the rotor of which is mechanically coupled to the rotor of said rotary transformer so that the ratio of the two rotor speeds is always constant and the series motor functions as a counter-torque device for the transformer rotor. Speed is shown as positive when the transformer rotor turns in the direction which increases the output frequency, and is shown as negative when the rotor turns in the opposite direction. For convenience, both torques are shown as being positive. However, it will be understood that the torque of the series motor tends to turn the rotor of the rotary transformer in the direction which increases the output frequency, while the torque of the rotary transformer is in the opposite direction and tends to turn the rotor of the rotary transformer in the direction which decreases the output frequency. Thus the two torques are opposed, and under steady-state conditions are equal, if friction is negligible and if the torque multiplying effect of the coupling gearing is considered. The speed versus torque curves B, C and D differ one from the other due to the effect of added resistance in series with the series motor. Curve B is without any series resistance; Curve C is with approximately half of the series resistance in the circuit; and curve D is with all of the resistance in the circuit.

It will be observed that for positive speeds, the counter-torque device is operating as a motor and at negative speeds it is operating as a generator absorbing power from the shaft of the rotary transformer. It will also be observed that at each intersection with the torque curve A, the net torque becomes zero; and that the series motor torque is the same over the complete speed range plus and negative. It will now be apparent from the foregoing analysis that constant current is present in the series motor as it goes through its speed range from positive to negative by the addition of series resistance. When operating the series motor from an alternating current source an electron discharge device of the thyratron type may provide the variable series resistance, as is well known in the art.

By mechanical coupling of the series motor to the rotor of the rotary transformer so that a constant speed ratio is maintained between the rotors of the two machines, the respective torque versus speed characteristics of the two machines are utilized to provide a simplified and more efficient frequency regulating system, as hereinafter described.

Referring now to Figs. 2, 3, and 4, wherein like parts in all figures are represented by like reference characters, the lines 10 designate a three-phase alternating-current power circuit which is subject to appreciable variations in frequency, such as one may expect on a power system on which the load varies considerably. For example, the circuit 10 may be a 60 cycle per second system supplied by turbo-alternators for furnishing power to the propelling motors and other electrical apparatus on a vessel, such that a frequency variation may be expected that would prohibit the use of the system for the distribution of time by means of synchronous motor driven secondary clocks or other devices dependent on a constant frequency. The circuit 11 represents an alternating current system on which it is desired that the frequency shall be maintained constant and suitable for supplying the aforementioned devices.

The circuit 11 is supplied from circuit 10 through a rotary transformer or like device 12. The device 12 acts partly as a transformer and partly as a wound rotor induction motor, and it will be assumed that the desired frequency in circuit 11 is 60 cycles per second. Preferably, the primary of the rotary transformer 12 is the stator thereof and is three-phase, while the rotor 14 of said transformer is the secondary and can be three-phase, although a single phase secondary is equally adapted to the use of the present invention.

The circuit 11 is connected to supply a load circuit 13 which operates at the assumed frequency of 60 cycles per second. It may be assumed that the load 13 will remain substantially constant or that, if this load is changed from time to time by a large amount sufficient to disturb the speed adjustment of the rotary transformer 12, a compensating adjustment will be made in the speed-regulating apparatus hereinafter described. Assuming a constant load on the circuit 11 and a constant voltage on the circuit 10, it will be evident that, without regulation, the frequency in circuit 11 would tend to rise and fall with a rise and fall of frequency in the circuit 10. Also, assuming constant frequency in circuit 10 and a constant load on circuit 11, it will be evident that, without regulation, the frequency in circuit 11 will vary with voltage changes in circuit 10 since this will tend to vary the speed of the rotary transformer acting as an induction motor. Also, the frequency and voltage in the circuit 10 may both vary simultaneously in a variety of relations. The regulation required of the transformer 12 must, therefore, take into consideration variations in frequency and variations in voltage in the circuit 10 and various combinations of such variations.

The rotor 14 of the transformer 12 should rotate at high slip in order to have reasonably efficient transformer action and a practicable secondary voltage and frequency, and such operation should be stable under normal conditions.

In order to control the aforementioned slip and thereby control the frequency in the circuit 11, a series motor 15 is coupled to the rotor 14 through gears 16. An internal torque is developed in the rotary transformer 12 which tends to turn rotor 14 in a direction which would decrease the frequency in circuit 11. It is the function of the series motor 15 to impose a counter-torque on the rotor 14 so as to maintain the speed of the rotor at a value which will produce the desired frequency in the circuit 11. This novel use of a series motor as a counter-torque device and arrangement of the control means, to be described below, is a feature of the present invention.

In Fig. 2, the series motor 15 is energized by a source of electric power 17 which may supply either direct or alternating current. In order to control the amount of current flowing through motor 15 a variable impedance such as a rheostat 18 is provided. The resistance of rheostat 18 may be varied by a sliding contact 19 which is connected by a conductor 20 to the junction of the rheostat 18 and the motor 15. Actuation of the slider 19 is accomplished by the time-error device 21 which may be, for example, a differential Selsyn. The device 21 has one of its windings (not shown) connected by conductors 22 to the circuit 11, and the other winding (not shown) connected by conductors 23 to a source of standard frequency power 24. For example, said standard frequency may be 60 cycles per second. The standard frequency source may be energized by a pair of conductors 25 connected to source 17. The Selsyn 21 is connected to drive a lead screw 26 to which the slider 19 is suitably coupled.

The operation of the above described system is as follows: If the output frequency of the rotary transformer 12 is not equal to the standard frequency 24, caused by a variation of the frequency in the circuit 10, the differential Selsyn 21 will be actuated. The motion of the Selsyn will, in turn, cause the sliding contact 19, by means of the lead screw 26, to move across the rheostat 18, thereby changing the value of its resistance. This change in the resistance of the rheostat 18 will alter the torque of the series motor to the extent that the speed of the rotor 14 will be caused to come to a new balance point. The value of the maximum resistance of rheostat 18 is selected to provide a torque balance that will occur over the speed range required of the series motor 15 to correct the frequency in circuit 11 to 60 cycles per second, or any other selected frequency, and to satisfy the torque requirements at full load on the rotary transformer 12.

The slider 19 will continue to move until the output frequency of the transformer 12 exactly matches the standard frequency source 24, at which point the Selsyn will cease rotating and the rotary transformer 12 will continue to operate at the new speed as long as the frequency of the primary system remains unchanged. The maximum time error which can accumulate is established by the length and threads per inch on the lead screw 26. Assume that the frequency in the circuit 11 is exactly correct and the slider 19 is at the center position on the rheostat 18. The rotor 14 is now stationary because the internal rotor torque is exactly balanced by the series motor torque. Since the frequency in the circuit 11 is correct under these conditions, no rotation occurs in the Selsyn 21. Assume now that the unregulated supply frequency rises 3.5 cycles per second. The secondary frequency in circuit 11 will also rise. This will cause the Selsyn 21 to rotate at a speed which is proportional to the frequency error. The number of turns the rotor 14 makes is a measure of the time error in circuit 11. When the Selsyn 21 rotates in response to a frequency which is too high, the resistance of rheostat 18 is increased. The rotor 14 can then rotate (slip in the direction of internal torque) so that the output frequency in the circuit 11 approaches 60 cycles. When a certain value of resistance has been inserted in series with the motor 15, the output frequency is exactly correct and no further change of position of the slider 19 takes place. Assume the supply system frequency is now restored to 60 cycles per second. The output frequency of the rotor 14 would now be too low. This would cause the Selsyn 21 to rotate in a reverse direction and thereby reduce the resistance in the rheostat 18. The series motor 15 will now produce more counter-torque, thus slowing up the rotor 14 until the output frequency is correct. At this point the Selsyn 21 stops rotating and the slider 19 will again assume its center position. As the new balance point is approached, the motion of the slider 19 slows down. This provides an anti-hunt feature which renders the system stable. The position of the slider 19 on the rheostat 18 can be utilized to indicate the frequency deviation of the power source.

In the system above described, the integrated frequency is held constant. In Figs. 3 and 4 there will be described means, utilizing the present invention, for maintaining the instantaneous output frequency constant.

In the modification shown in Fig. 3, current is supplied to the series motor 15 through a variable impedance device, such as an electron discharge tube 27 of the thyratron type comprising an anode 28, a grid 39 and a cathode 36. The anode 28 of said device 27 is connected to the series motor 15 by means of a conductor 29 and thence through a second conductor 30 to a source of power comprising a secondary winding 31 of a transformer 32 having a primary winding 33. The primary winding 33 is connected to a single phase terminal 34 of the circuit 11. From the secondary winding 31, the circuit for motor 15 is completed by a conductor 35 to the cathode 36 of said discharge device 27. The series motor is thus supplied with a rectified potential via the discharge device 27. A phase control network 37 is provided which is supplied by a transformer 38 coupled to the single phase terminals 34 of the secondary system 11. This network 37 furnishes a voltage to the grid 39 which is normally shifted ninety degrees from the anode voltage. Connection to the grid is by means of a conductor 40 from the center of a secondary winding 41 of transformer 38, through a secondary winding 42 of a third transformer 43. The primary winding 44 of transformer 43 is connected to a pick-up coil 45 of a tuning-fork generator 46, said tuning-fork generator serving as a frequency standard at a frequency, for example, of 60 cycles per second. The driving coil 47 is coupled to a fourth transformer 48. The secondary circuit of transformer 48 includes a secondary winding 49 which is connected through a capacitor 50 to the driving coil 47. A primary winding 51 of transformer 48 is coupled to the single-phase terminals 34 of the circuit 11. The capacitor 50 establishes the same phase relation of the generator 46 and generator excitation as is established by the network 37 when the frequency and phase relation of the circuit 11 are correct.

If now the frequency in the circuit 11 tends to alter either above or below the desired frequency of 60 cycles per second, it will be evidenced by a shift in phase between the voltage supplied to the grid by the network 37 and the tuning-form 46 voltage which is superimposed on the grid 37 circuit through the transformer 43. The resultant phase angle of the voltage applied to the grid will advance or lag with respect to the voltage of anode 28, and thereby decrease or increase the effective impedance of thyratron 27. This immediately corrects the tendency of the frequency in circuit 11 to change from the desired frequency by correcting the speed of series motor 15.

In Fig. 4, instead of drawing power from the circuit 11 to operate the series motor 15, such power is taken from the circuit 10 by means of a pair of conductors 52. The grid 39 of thyratron 27 which is connected in series relation with motor 15 is supplied with a potential taken from the circuit 10 by means of a pair of conductors 53, the transformer 38 and phase-control network 37. As explained above, the grid voltage thus supplied is normally shifted ninety degrees from the voltage of anode 28 by the network 37.

In the embodiment of Fig. 4, a phase-converter circuit 54, which may be, for example, of the type described in U. S. Patent No. 1,869,209, granted July 26, 1932, upon my application, is disposed between the circuit 11 and the standard frequency source 24. Said phase converter circuit is adapted to produce, in response to the difference in the phases of the system 11 and source 24, a direct current potential which varies proportionately with the variations of the phase relations of said circuit 11 and source 24, as described in the aforementioned patent. The direct current potential thus produced is applied to a suitable anti-hunting circuit 55, said circuit being coupled to the grid 39 for controlling the impedance of the thyratron 27. Anti-hunting circuit 55 may be a lead circuit, such as those commonly used in servomechanism systems for similar purposes. A simple form of such a circuit is shown in "Fundamental Theory of Servomechanisms," by L. A. MacColl, published in 1945 by D. Van Nostrand Co., Inc., New York City, page 51, Fig. 17.

The operation of the embodiment of the invention illustrated in Fig. 4 is substantially as follows: Let it be assumed that the frequency of circuit 10 tends to drift lower than the desired frequency of, for example, 60 cycles per second. This would cause a similar condition to appear in the circuit 11. However, the voltage supplied by circuit 11 to the phase converter circuit 54 will shift in phase with the voltage of the standard frequency source of 60 cycles per second due to the frequency drift. The phase-converter circuit 54 will produce a direct current voltage, the magnitude of which is a function of the phase difference above referred to. If this voltage be superimposed directly on the grid voltage, it will alter the bias thereon in accordance with phase difference above mentioned, thereby increasing or decreasing the effective impedance of thyratron 27, depending upon its polarity. This impedance change causes a corresponding change in speed of the series motor and consequently the frequency in the circuit 11 will be maintained at the desired value. In order to avoid the tendency of the series motor to oscillate or hunt for the proper position to correct the frequency difference heretofore discussed, the anti-hunting circuit 55 is disposed between phase-converter 54 and the grid 39 circuit. Any hunting of the system produces a low-frequency alternating component in the output voltage of phase converter 54. The anti-hunting or lead circuit 55 advances the phase of this alternating component, so that the voltage applied to the thyratron grid leads or anticipates the phase error due to hunting. This leading or anticipating signal suppresses the hunting, as is well known in servomechanism theory.

While I have shown and described particular embodiments of the present invention, it will be obvious to those skilled in the art that various changes and modifications may be made without departing from the invention, and it is, therefore, intended in the appended claims to cover all such changes and modifications as come within the true spirit and scope of the present invention.

What I claim as new and desire to secure by Letters Patent of the United States is:

1. A frequency regulating system for a rotary transformer having a stator member provided with a polyphase alternating current winding and a rotor member provided with an alternating current winding and arranged to transmit power therebetween at a frequency in dependence upon the relative speed of said members, comprising a direct current series motor mechanically coupled with a fixed speed ratio to said rotor member and arranged to be operated with a torque counter to the torque of said rotor member, a source of standard frequency alternating current, and means for varying the energization of said series direct current motor in accordance with the deviation of the frequency of the voltage of the alternating current rotor winding from the frequency of the voltage of said frequency standard.

2. A frequency regulating system comprising a polyphase alternating current circuit, a load circuit, a rotary transformer including rotor and stator members and having a polyphase primary winding connected to said alternating current circuit and secondary winding connected to said load circuit, a series motor mechanically coupled with a fixed speed ratio to the rotor of said transformer, a source of alternating current having a standard frequency, means for energizing said series motor, and means for controlling the speed of said series motor in response to any difference in frequency between current in secondary winding and the standard frequency current, to maintain the frequency of the output of said secondary winding in synchronism with said standard frequency.

3. A frequency regulating system comprising a rotary transformer including rotor and stator members and having a polyphase primary winding adapted to be connected to a source of alternating current and a secondary winding adapted to supply a load, a series motor mechanically coupled with fixed speed ratio to the rotor member of said transformer, a source of alternating current having a standard frequency, means for energizing said series motor, a differential Selsyn having one of its windings connected to the secondary winding of said transformer and its other winding connected to said standard frequency source, and a variable resistance in series with said energizing means and said series motor, said resistance having a slidable contact coupled to be driven by said differential Selsyn for altering the speed of said series motor when said Selsyn motor is actuated in response to any frequency deviation in the output of said secondary winding, to maintain the frequency of the output of said secondary winding substantially in step with said standard frequency.

4. A frequency regulating system comprising a polyphase alternating current circuit, a load circuit, a rotary transformer including rotor and stator members and having a polyphase primary winding connected to said alternating current circuit and a secondary winding connected to said load circuit, a series motor mechanically coupled with a fixed speed ratio to said induction motor, a tuning-fork generator source of alternating current having a standard frequency, said tuning-fork generator having a driving coil connected to said secondary winding, an electrical circuit connected to said secondary winding for energizing said series motor, a grid-controlled gaseous rectifier connected in series with said series motor and its energizing circuit, and a phase-shifting circuit coupled to said secondary winding and standard frequency source for impressing on the grid of said rectifier a potential for varying the speed of said series motor, to maintain the frequency of the output of said secondary winding substantially the same as the standard frequency.

5. A frequency regulating system comprising a polyphase alternating current circuit, a load circuit, a rotary transformer including rotor and stator members and having a polyphase primary winding connected to said alternating current circuit and a secondary winding connected to said load circuit, a series motor mechanically coupled with a fixed speed ratio to the rotor member of said transformer, means for furnishing the direct-current excitation to said series motor including a grid controlled gaseous rectifying tube electrically connected in series with said motor, a source of standard frequency alternating current, a phase converter connected to the secondary winding of said transformer and to said source of standard frequency current to provide an essentially direct current having a value dependent upon the phase relation of current in said secondary winding to the standard frequency current, and an anti-hunt lead circuit connected between said phase converter and the grid of said rectifying tube to advance the phase of alternating-current components in the essentially direct current output of the phase converter and thus suppress hunting.

MILTON S. MEAD, JR.

REFERENCES CITED

The following references are of record in the file of this patent:

UNITED STATES PATENTS

| Number | Name | Date |
| --- | --- | --- |
| 559,187 | Miller | Apr. 28, 1896 |
| 1,604,163 | Herman | Oct. 26, 1926 |
| 1,961,039 | Franklin | May 29, 1934 |
| 1,992,625 | Mathes | Feb. 26, 1935 |